United States Patent
Kajita

(10) Patent No.: US 9,828,301 B2
(45) Date of Patent: Nov. 28, 2017

(54) GRANULE FOR DELIVERING HUMATES AND USES THEREOF

(71) Applicant: Oil-Dri Corporation of America, Chicago, IL (US)

(72) Inventor: Laura Kajita, Chicago, IL (US)

(73) Assignee: OIL-DRI CORPORATION OF AMERICA, Chicago, IL (US)

( * ) Notice: Subject to any disclaimer, the term of this patent is extended or adjusted under 35 U.S.C. 154(b) by 41 days.

(21) Appl. No.: 14/950,851

(22) Filed: Nov. 24, 2015

(65) Prior Publication Data

US 2016/0145162 A1 May 26, 2016

Related U.S. Application Data

(60) Provisional application No. 62/084,445, filed on Nov. 25, 2014.

(51) Int. Cl.
 C05F 11/02 (2006.01)
 C05G 3/00 (2006.01)

(52) U.S. Cl.
 CPC ............ *C05F 11/02* (2013.01); *C05G 3/0058* (2013.01)

(58) Field of Classification Search
 CPC .............................. C05F 11/02; C05G 3/0058
 See application file for complete search history.

(56) References Cited

U.S. PATENT DOCUMENTS

| | | | |
|---|---|---|---|
| 3,036,333 A | 5/1962 | Sainty | |
| 5,456,737 A * | 10/1995 | Manning | A01K 1/0154 241/21 |
| 6,238,473 B1 | 5/2001 | Maxwell et al. | |
| 6,716,418 B2 | 4/2004 | SenGupta et al. | |
| 2008/0302152 A1* | 12/2008 | Van Rooijen | C05F 3/00 71/24 |
| 2009/0120339 A1* | 5/2009 | Detweiler | C05F 11/02 111/118 |
| 2011/0077155 A1* | 3/2011 | Goodwin | A01N 25/08 504/101 |
| 2014/0230504 A1* | 8/2014 | Finlayson | C05F 11/02 71/6 |
| 2015/0361005 A1* | 12/2015 | Skowronek | C05F 11/00 71/6 |

OTHER PUBLICATIONS

International Search Report dated Feb. 12, 2016, which issued during prosecution of International Application No. PCT/US2015/062443.

International Preliminary Report on Patentability and Written Opinion of the International Searching Authority dated May 30, 2017, which issued during prosecution of International Application No. PCT/US2015/062443.

\* cited by examiner

*Primary Examiner* — Wayne Langel

(74) *Attorney, Agent, or Firm* — Vedder Price P.C.; Deborah L. Lu; Mark W. Russell

(57) ABSTRACT

The present invention relates to a mineral or organic carrier capable of binding a source for humates and/or fulvic acid; and a pH adjuster or modifier, methods for manufacturing the same as well as agricultural and pesticidal uses of the same.

23 Claims, 10 Drawing Sheets

(10 of 10 Drawing Sheet(s) Filed in Color)

GRANULE FOR DELIVERING HUMATES AND USES THEREOF

RELATED APPLICATIONS AND INCORPORATION BY REFERENCE

This application claims benefit of and priority to U.S. provisional patent application Ser. No. 62/084,445 filed Nov. 25, 2014.

The foregoing application, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to a mineral or organic carrier capable of binding a source for humates and other optional materials such as a pH adjuster or modifier and uses thereof.

BACKGROUND OF THE INVENTION

Various products are available in the agricultural markets to improve plant and crop growth or success. For example, clay granules are used as a carrier for pesticide active ingredients that are planted with corn to combat corn rootworm. One such carrier is AgSorb®, a mineral based product which may be utilized to deliver a chemical, biological or biorational active ingredient to a plant or crop.

Verge™ is an engineered granule built up from clay "fines"—the smallest screened particles. The basic Verge™ process involves mixing the fines with water, and extruding this mixture through various die plates to make "noodles." The die plates can be changed to make noodles of different diameters. The mixture might also be extruded under different pressure using either a high pressure extruder (e.g., axial extruder) or lower pressure extruder (e.g., basket extruder). The noodles are then cut into small segments and placed in a device that rounds or spheronizes them into virtually dust free, free-flowing and nearly perfectly spherical particles. The noodles might also be cut and dried without rounding or spheronizing and further reduced in size if desired. Because of the absorbency and natural binding characteristics of clay, various other liquid and powdered materials can be added at the beginning of the process to provide additional attributes to the resulting engineered Verge™ granule. Additionally, the extrusion process itself enhances certain attributes of a resulting product. This particular application involves adding a humic acid source in a manner that enhances the delivery of humates to the plant.

In addition to extrusion, the composition in this invention can be processed into granules by other methods including agglomeration and compaction/pressing. Agglomeration involves the building up of smaller particles into larger particles. The process utilizes the circulatory/tumbling action of a rotating disc pan (pan agglomerator) or the friction action of a pin mixer to aggregate or build up finer particles into larger granules. Oftentimes, water and/or binding agents are used to help build up the particles into granules and different mixing/rotating speeds are used to control final granule size. Pre-mixed blends of small particles can be agglomerated into larger granules. In addition, other additives may be added to the particles during the agglomeration/build up processing. The final agglomerated granules might be dried depending upon the desire moisture content.

Compaction is another method used to turn loose smaller particles into larger, dense aggregated masses. Smaller particles are placed under pressure and compressed into various solid forms that might include bars, cubes, pellets, pills, etc. Misted water or steam might be used in the process along with binders that aid in compaction. Pre-mixed blends of smaller particles can be pressed into larger forms as well and the pressure can be adjusted accordingly to desired characteristics. Oftentimes, larger massive compacted blocks are further reduced in size via grinding or crushing. The reduced matter is then screened to desire particle sizes. Smaller pressed pills (1 mm-3 mm) are used as is.

Humates are basically salts of humic acids and normally include humic acid, fulvic acid, and ulmic acid. Humic and fulvic acids are strong chelating agents whose properties benefit plants and trees. Humic and fulvic acids are produced by biodegradation of dead organic matter. Humic acid is not a single acid; rather, it is a complex mixture of many different acids containing carboxyl and phenolate groups so that the mixture behaves functionally as a dibasic acid or, occasionally, as a tribasic acid. Humic and fulvic acids are commonly used as a soil supplements in agriculture, and less commonly as human nutritional supplements. A natural source of humic and fulvic acid is leonardite.

Some products take leonardite and form it into a pellet or granule for depositing on crops. Pelleted leonardite comes with several disadvantages. First, the resulting pellets are very dusty. Workers must take precautions to avoid exposure to the dust, the leonardite may blow away before it can be utilized by the plant, or leonardite may drift to areas where it is undesirable. Second, leonardite is low in pH. Third, only some, but not all, of the humic acid in the leonardite pellets is released over time into the soil. Fourth, because leonardite pellets have very little "liquid holding capacity," there is no opportunity to load anything to the resulting product. As a result, leonardite pellets are often one component of a soil supplement solution, and other processes—such as separately increasing the pH of the soil through sprays or other solutions to maximize humic acid release, and adding other materials to the soil—are separately required.

Alternatives to pelleted leonardite also have significant disadvantages. Some means to extract humic acid from leonardite use strong caustic solutions (for example, potassium hydroxide or sodium hydroxide). The resulting material is highly corrosive, and poses various health-related risks to handlers of the material and needs to be diluted before it can be safely applied.

Citation or identification of any document in this application is not an admission that such document is available as prior art to the present invention.

SUMMARY OF THE INVENTION

One of the benefits of a manufactured clay granule is that ingredients may be added into the granule as it is being formed rather than requiring a blending step to mix ingredients with the granule or applying more than one application to the plant. Verge™ humic acid (H.A.) is one of these products. It combines the normal process to create the Verge™ granule with (a) leonardite, a natural source of humic and fulvic acid, (b) a pH adjuster, currently in the form of soda ash (sodium carbonate), and may also include (c) an additional dispersant regulator with some pH adjustment effect, which could be sodium triphosphate (STPP), sodium acid pyrophosphate (SAPP), more sodium carbonate, sodium bicarbonate, or any other pH adjuster or dispersant. Verge granules are engineered, in the sense that they are a reconstituted powder clay that has been subjected to heating to remove excess water, extruded, spheronized, dried (or heat treated), and screened, resulting in a dust free, free flowing granule.

The result is a dry granule delivered with a high pH (>7), and Applicants have discovered that the high pH combined with the extrusion process itself are key factors in allowing humic acid to be released into the soil where it can then be available to the plant. An additional result is a dry granule that releases fulvic acid more efficiently into the soil where it can benefit plant growth.

The present invention relates to:

(i) a mineral or organic carrier capable of binding the other ingredients of (ii) and (iii) and which may be extruded and spheronized and/or being agglomerated and dried;

(ii) a source for humates and/or fulvic acid; and (iii) either (a) a pH adjuster or modifier to increase the pH of the resulting product; and/or (b) a dispersant with a pH adjustment effect.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description, given by way of example, but not intended to limit the invention solely to the specific embodiments described, may best be understood in conjunction with the accompanying drawings.

DETAILED DESCRIPTION OF THE INVENTION

Figure 1:
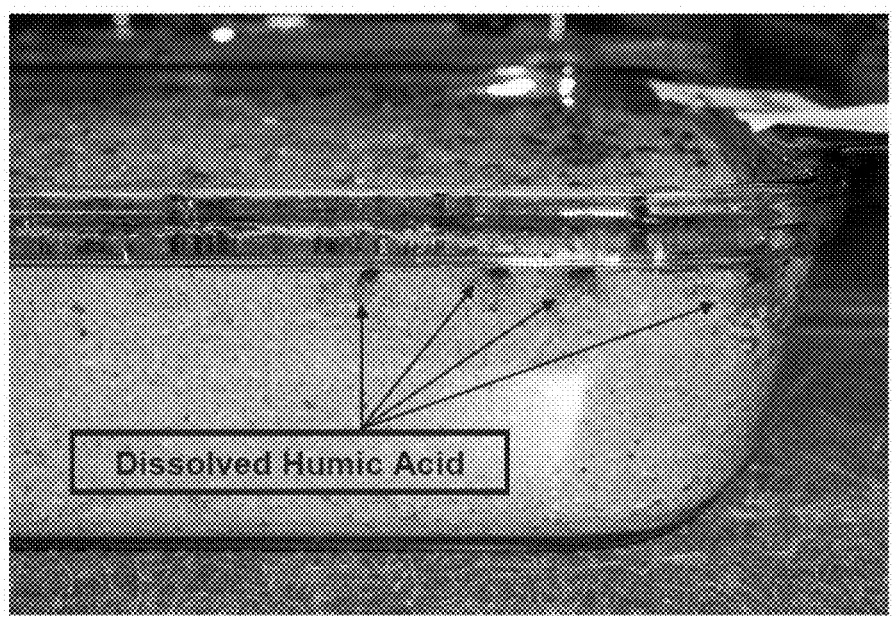
FIG. 1 depicts treatment sample #6 after its initial watering.

One of the benefits of a manufactured granule is that Applicants can add ingredients into the granule as it is formed rather than requiring a blending step to mix ingredients with the granule. Verge™ H.A. combines the Verge™ granule with (a) leonardite, which is a natural source of humic and fulvic acid, (b) a pH adjuster, currently in the form of soda ash (sodium carbonate), and may also include (c) an additional dispersant regulator with some pH adjustment effect, which could be STPP, SAPP, more sodium carbonate, sodium bicarbonate, or any other pH adjuster or dispersant.

To increase fulvic acid content, liquid fulvic acid solution may be added into the processing of the granules, either blended with the water (used in extrusion or agglomeration) or as a replacement to the water used in extrusion or agglomeration. Fulvic acid products are available in liquid form and are produced as a by-product of the humic acid extraction. These liquids have lower concentrations of fulvic acid and are low-neutral in pH. These products also tend to contain other organic compounds in addition to fulvic acid.

The result is a versatile dry granule that can be delivered with a high pH and greater yield of any attached ingredient. Applicants have discovered that a higher pH (between 8-10) is the key factor allowing humic acid to be released into the soil where it can then be available to the plant. No existing product has combined that range of pH with a humic/fulvic acid source. As a result, existing products generate lower yields from the humic acid source (usually leonardite) than with Applicants' invention. Advantageously, the granule has a pH with a range from about pH 6 to about pH 10.

Verge™ H.A. has multiple advantages over alternative means to deliver humic and fulvic acid to crops. For example, there is no comparable dry granule with a higher pH. Compared to just leonardite, the particle has significant "liquid holding capacity" as this term is defined by an ASTM sanctioned test method (ASTM Standard Test Method E 1521-93 Liquid Holding Capacity (LHC) of Clay Granular Carriers). This test method evaluates how much of a liquid can be loaded onto a carrier granule. Higher liquid hold capacity values indicate more of liquid (such as pesticide, or agricultural nutrient) can be applied to the granule while maintaining free-flowing characteristics. Applicants expect that their customers may use the additional 15% capacity to add a pesticide to the particle, a bio-stimulant (such as kelp extract) or some other additional materials useful for the crop.

Although the Verge™ H.A. granule contains less humic acid than a leonardite only granule (leonardite contains typically 50%-80% humic acid), tests show that more humic and fulvic acid is released faster from the Verge™ H.A. granule.

Even when Verge™ H.A. is manufactured for "slow release," more humic acid is released from the leonardite using the Verge process compared to mere pelleted leonardite. Applicants estimate that five times more humic acid is released using the Verge™ H.A. granule than with leonardite alone.

The manufacturing process allows for the Applicants to vary the "liquid holding capacity," and the humic acid release rate by adjusting amount of soda ash or other pH adjusting chemicals.

The product is easier to handle than liquids which are highly corrosive and require dilution, and can be spread at various times during the planting season because the pH is more neutral than alternative materials.

By combining various plant needs in the same granule (e.g., another biostimulant, such as kelp extract loaded on Verge™ H.A.), crop preparation costs and efforts are reduced.

Farmers have long used clays in their spreaders and planters and are familiar with clay properties. Clay (calcium bentonite and montmorillonite) are already approved for use as binders for farm agricultural products and chemicals.

The Verge™ H.A. product is significantly less dusty than alternative dry products, resulting in less processing and handling issues. Dust is a significant issue for certain agricultural products because of "drift" where materials blow to areas where they are not intended to go (such as other fields or places where vulnerable insects, plants or animals live). Less dusty products require handlers to wear less protective gear reducing costs, application time, and risks.

The clay itself naturally contains some humates, which adds to its benefits.

The present invention relates to:
(i) a mineral or organic carrier capable of binding the other ingredients of (ii) and (iii) which may be extruded and spheronized and/or agglomerated and dried;
(ii) a source for humates and/or fulvic acid; and
(iii) either
(a) a pH adjuster or modifier to increase the pH of the resulting product; and/or
(b) a dispersant with a pH adjustment effect.

The present invention also relates to a manufacturing process to incorporate the carrier, the humate(s), the fulvic acid, the adjuster/modifier and/or dispersant. The method generally involves pre-mixing the carrier, the humate(s), and the adjuster/modifier and/or dispersant, extruding a powder blend with water through a die plate (ranging from 0.5 mm to 2.2 mm die plates,), spheronized and dried. The blended mixture might also be agglomerated into granules that are dried. The granules may be screened to be 1 mm, 1.2 mm, or 2.0 mm depending upon the application. The screening is primarily accomplished by the extruder screen. After the drier, the granules that are larger or smaller than the desired size are screened off.

The present invention relates to a mineral or organic carrier capable of binding a humate source and a pH adjuster/modifier and/or a dispersant. A wide variety of minerals/carriers could be used for this application, including Montmorillonite (both calcium and sodium), Attapulgite, Palygorskite, Sepiolite, Fuller's Earth, recycled paper, fly ash, spent bleaching clay (clay/oil by-product from the bleaching of vegetable oils), wheat hulls, rice hulls, powdered walnut shells, bran powders, quartz, and/or combinations of these materials. In a preferred embodiment, calcium bentonite montmorillonite clay fines from Mississippi's Porter Creek Formation is advantageous because of the material's high liquid holding capacity.

The present invention also relates to a source of humates. In a preferred embodiment, leonardite is a source of humic and fulvic acid, a particular humate. In some instances, the source for humate and the carrier are the same (for example, The Anderson's DG® products, and to some extent, Applicants' selected clay).

The present invention relates to all humates and alternatives to leonardite as a source of humates.

Humic and fulvic acid are principal components of humic substances, which are the major organic constituents of soil (humus), peat, coal, many upland streams, dystrophic lakes, and ocean water. It is produced by biodegradation of dead organic matter. It is not a single acid; rather, it is a complex mixture of many different acids containing carboxyl and phenolate groups so that the mixture behaves functionally as a dibasic acid or, occasionally, as a tribasic acid.

A typical humic substance is a mixture of many molecules, some of which are based on a motif of aromatic nuclei with phenolic and carboxylic substituents, linked together. The average chemical formula for humic acid is $C_{187} H_{186} O_{89} N_9 S_1$.

Potassium humate is the potassium salt of humic acid. It is manufactured commercially by alkaline extraction of leonardite (brown coal) or peat and is used as a soil conditioner. The extraction is performed in water with the addition of potassium hydroxide (KOH), sequestering agents and hydrotropic surfactants. High quality oxidized lignite (brown coal) usually referred to as leonardite is the best source material for extraction of large quantities of humic acid. The less oxidized the coal the less potassium humate extracted. Fulvic acid products are available in liquid form and are produced as a by-product of the humic acid extraction. These liquids have lower concentrations of fulvic acid and are low-neutral in pH. These products also tend to contain other organic compounds in addition to fulvic acid.

The present invention also relates to a pH adjuster or modifier to increase the pH of the resulting product. In a preferred embodiment, Applicants use soda ash (such as sodium carbonate, potassium hydroxide, sodium hydroxide, calcium hydroxide, and other alkali metal bases) to increase the pH, as Applicants have determined that a higher pH allows the humic acid to be released quicker from the carrier and be available to the soil where it is deposited.

Figure 10:
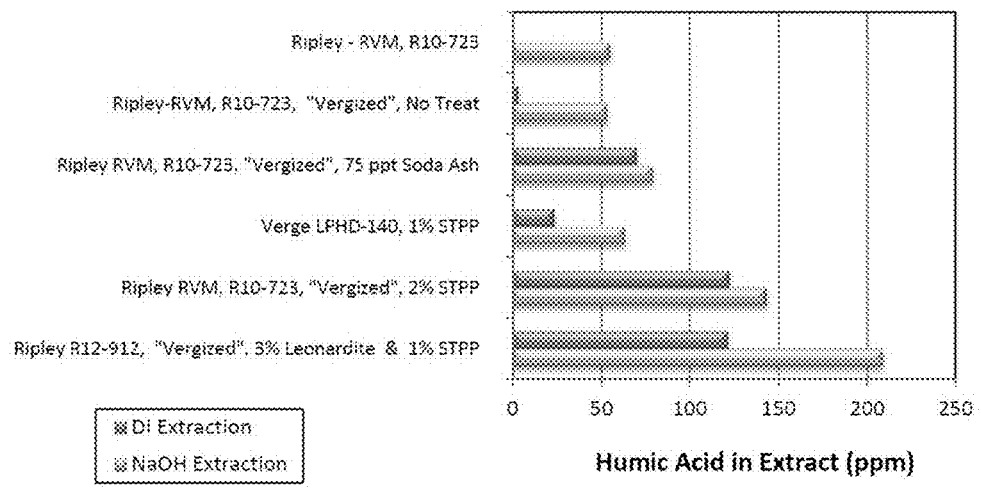
FIG. 10 shows that release of extractable fulvic acid is more dependent upon the chemical dispersant efficiency and/or clay processing versus pH.

The present invention also relates to a dispersant. In the preferred embodiment, sodium carbonate at a 1%-10% for faster release and STPP (sodium tripolyphosphate) or SAPP (sodium acid pyrophosphate) for a slower release which allows the clay to disperse, not the leonardite that is bound with the clay. In some embodiments, the pH adjuster or modifier and dispersant are the same. It has been found that the dispersant can help release more fulvic acid than without (see, e.g., FIG. 10).

Applicants observed an increase in the amount of humic acid released from Verge™ granules that had been processed from clay dried at a lower kiln temperature (RVM or regular volatile material) These granules had incorporated leonardite as a humic acid source. The humic acid containing Verge™ granules can be formulated to be either quick-releasing or slow-releasing depending upon the type of chemical dispersant used.

Leonardite fines (up to 50% content) may be combined with regular volatile material clay fines from the Porters Creek Formation and sodium carbonate or sodium bicarbonate (1%-10%) for quick-releasing granules or STPP (sodium tripolyphosphate) (1%-10%) for slow-releasing granules to the clay/leonardite blend. The clay/leonardite/dispersant may be formulated into Verge™ granules using a current Verge™ process.

Two Verge™ H.A. (humic acid) prototypes were prepared. Both were formulated with 10% leonardite fines which added about 5% humic acid to the granules. One of the two prototypes was formulated with 3% sodium carbonate (soda ash) to make the fast-releasing sample Verge™ H.A. HpHD (high pH disintegrating). The other prototype was formulated with 2% STPP to make the slow-releasing sample Verge™ H.A. LpHD (low pH disintegrating).

A lab growth study was conducted using rye grass seeds and inert sand as the growth medium (instead of soil). Two different fertilizers were used in the study to test the effects of adding the two Verge™ H.A. prototypes. pH testing (@5% solids) was also done on the prototypes in confirm the effects of the two disintegrants. Previous humic acid testing conducted on Verge granules and clays (that had been processed by the Verge™ process) revealed the Verge granules and base clays may comprise about 1%-2% naturally occurring humic acid.

After five weeks, the growth study revealed that using a combination of fertilizer and Verge HA HpHD was a significant improvement over using fertilizer alone. The addition of Verge HA HpHD not only increased the rate of grass growth, but also increased the fullness and density of grass growth in the sample trays. This was the case with both fertilizers.

Testing also revealed a 33% increase in plant/grass mass in the sample that included both Scotts® Fertilizer and Verge™ H.A. HpHD over the sample with Scotts® Fertilizer alone.

The study also showed that after about 3 weeks, the slow-releasing Verge™ H.A. LpHD growth tray was starting to "catch up" to the fast-releasing prototype.

pH testing showed the Verge™ H.A. HpHD granules have a pH ranging from about 8 to 10 while the Verge™ H.A. LpHD have a pH ranging from 5.5 to about 6.5. Because humic acid dissolves in high pH, this confirms the Verge™ H.A. HpHD will release its humic acid quicker than the Verge™ LpHD and/or standard leonardite.

Previous humic acid testing indicated that the Verge™ process (extrusion and spheronization) allows more natural humic acid in the clays to become more easily extractable than clays that have not been extruded. It is theorized that the extrusion process shears and exfoliates the clay as well as the leonardite platelets, allowing more humic acid to be exposed and more readily extractable.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1

Testing Verge™ H.A.

The objective of this Example is to assess the effects of adding humic acid to Verge™ on plant growth.

Humic acids are organic compounds that are commonly found in soils, sediments, and aquatic areas. They are chelating agents that bind to mineral nutrients, allowing plants to absorb and process these nutrients more efficiently. Recent exploratory research revealed that certain clays from the Porter's Creek Formation contain 1%-2% humic acid naturally. It was also found that extruding clays from the Porter's Creek Formation allowed more humic acid to be extractable.

This Example involved adding humic acid to Verge™ granules by incorporating leonardite (a natural humic and fulvic acid source) into the granule. Two different dispersants (sodium carbonate and sodium tripolyphosphate) were used to adjust the pH of the prototypes to yield a fast-releasing and a slow-releasing humic acid granular product. The study comprised of growing rye grass seeds in inert silica sand and the two prototypes were tested with two different fertilizers.

Using a combination of fertilizer and the quick-releasing Verge™-HA HpHD showed significant improvement in grass growth over using fertilizer alone. The addition of Verge™-HA HpHD had increased the rate and mass of grass growth with both fertilizers.

After three weeks, the grass treated with the slow-releasing Verge™-HA LpHD, started to "catch up" to the fast-releasing Verge™.

Verge™-HA HpHD improves grass growth more than leonardite because its humic is more soluble and quicker-releasing than standard leonardite.

Leonardite is oxidized coal and is a source of natural humic acid. Leonardite fines (−60 mesh) was obtained from Leonardite Products, LLC and contained about 50% humic acid. To increase the humic acid content in Verge by 5%, 10% leonardite fines was added to the Verge feed. Humic acid dissolves in higher pH environments while neutral or lower pH environments allow for lower solubility of humic acid. Two different dispersants were added to the formulations to obtain a fast-releasing (higher pH) prototype and the slow-releasing prototype (lower pH). Humic acid dissolves in higher pH environments while neutral or lower pH environments allow for low solubility of humic acid. The two prototype formulations were processed into granules in the pilot plant using the Verge process. Extrusion was done using the Bonnot axial extruder (with 0.8 mm die plate) and the noodles were spheronized. The Verge-HA prototype formulations are listed in Table 1 below.

TABLE 1

Verge-HA formulations and processing.

| | Verge-HA HpHD | Verge-HA LpHD |
|---|---|---|
| Formulation | 87% Verge Fines/Feed<br>10% Leonardite Fines<br>3% Sodium Carbonate | 88% Verge Fines/Feed<br>10% Leonardite Fines<br>2% Sodium Tripolyphosphate |
| Processing | Verge feed, leonardite, and sodium carbonate pre-mixed<br>Powder blend extruded with water through 0.8 mm die | Verge feed, leonardite, and STPP pre-mixed<br>Powder blend extruded with water through 0.8 mm die |

TABLE 1-continued

Verge-HA formulations and processing.

|  | Verge-HA HpHD | Verge-HA LpHD |
|---|---|---|
|  | plate<br>Extrudate spheronized and dried. | plate<br>Extrudate spheronized and dried. |
| Screening | 1 mm or (−16, +20 mesh) | 1 mm or (−16, +20 mesh) |

This study involved testing the growth of grass seeds in sand using fertilizers, the two Verge-HA prototypes, and leonardite fines. There was also a control sample where no fertilizer or additives were employed. The main goal of the study was to evaluate differences between the additives (and combinations of the additives) and their effects on plant growth.

Grass Seeds: Rye grass was chosen because of it fast growth characteristics. Pennington perennial rye grass seeds was used. It should be noted that these seeds had been treated with water-efficiency chemicals to aid in their germination.

Growth Medium: Inert quartz sand was the growth medium versus soil. Because the main goal of the study was to evaluate differences between the additives (and combinations of the additives), inert quartz sand was chosen because it would not contribute any nutrients to the plant growth (which might skew the results). Soil or potting mulch contains rich nutrients and humic matter might have added nutrients to the seeds, possibly resulting in non-definitive results. While normal field applications will not likely involve inert sand (like in a desert), this study needed to reveal the true differences between the test samples. XRD analysis was performed on five samples of sand to confirm the quartz content. Two of the five sand candidates were selected for the study because of their even particle size and their quartz purity. The two sand samples were combined into one composite sample which was used for the study.

Treatment Samples: Table 2 shows the various fertilizer/nutrient treatments and combinations. There were eight treatment samples total, including a Control sample where no treatment was applied. One of the fertilizers, Scott's Lawn Turf Starter, was tested with and without leonardite and the two Verge prototypes. Miracle Gro® Lawn was the other fertilizer tested in the study.

TABLE 2

Description of treatments.

| #1<br>CONTROL<br>(No Treatment) | #3<br>Miracle Grow<br>Fertilizer Only | #5<br>Scott's Fert.<br>& Leonardite Fines | #7<br>Scott's Fert.<br>& Verge-HA LpHD |
|---|---|---|---|
| #2<br>Scott's<br>Fertilizer Only | #4<br>Leonardite<br>Fines Only | #6<br>Scott's Fert.<br>& Verge-HA HpHD | #8<br>Miracle Grow Fert.<br>& Verge-HA HpHD |

The goal behind this test plan was to see if the two Verge-HA prototypes improved grass growth when used along with fertilizer. The study also aimed to see if the humic acid in the two Verge-HA prototypes worked better than using leonardite. The leonardite used in this study was the same leonardite used in formulating the two Verge-HA prototypes.

Treatment Application Doses: The fertilizers were applied to the sample dishes at half the recommended dosage rates to make the test harder and increase stress upon the growing plants. Table 3 lists the applications dosages of the fertilizers. At half the recommended dosage, this stressed situation might better reveal growth trends when leonardite or Verge-HA prototypes were added. The leonardite dosage was applied at the low recommended rate to see any differences. It should be noted that the amount of Verge-HA used in the sample treatments was calculated and measured so that the amount of active humic acid in the applied granules (Samples #6, #7, and #8) would equal the amount of humic acid contained within the dosage of leonardite applied (Samples #4 and #5).

TABLE 3

Application rates of fertilizers and nutrients used in study.

| Fertilizer/Nutrient | Application Rate used in Study | Active Nutrients |
|---|---|---|
| Scott's Turf Builder Starter | 1.5 lb/1000 sq ft | Nitrogen: 0.36 lbs/1000 sq ft<br>$P_2O_5$: 0.375 lbs/1000 sq ft<br>$K_2O$: 0.06 lbs/1000 sq ft |
| Miracle Grow Lawn Food | 0.6 lb/1000 sq ft | Nitrogen: 0.19 lbs/1000 sq ft<br>$P_2O_5$: 0 lbs/1000 sq ft<br>$K_2O$: 0.03 lbs/1000 sq ft |
| Leonardite Fines | 60 lb/acre or<br>1.4 lb/1000 sq ft | Humic Acid: 0.7 lb/1000 sq ft |
| Verge-HA HpHD<br>Verge-HA LpHD | 13.7 lb/1000 sq ft | Humic Acid: 0.7 lb/1000 sq ft |

Growth Dishes: The study used 8"L×8"W×2H" square glass casserole dishes as the growth trays. The eight dishes had the same shape and dimensions.

Hardware Set Up: The growth study was conducted in the lab on a lab bench. A 48" shop light fixture was suspended 25" from above the lab bench and two grow lights were installed in this light fixture. The grow lights were Philips T12, 48" and 40 watts. The grow light fixture was attached to a timer that was set to turn on at 6 AM and turn off at 8 PM (14 hours of illumination). The temperature in the lab was kept at a constant range of 65° F.-70° F.

One of the main concerns was to use consistency when preparing the growth sample dishes. The eight samples were prepared by the same technician. Each of the sample dishes was filled with the same amount of sand and the rye seeds were evenly applied to the top of the base sand layer. The amount of seeds used was based upon Pennington's web site recommendations and the same amount was used for each sample dish. The seeds were then covered with a layer of sand to help prevent seed drift and maintain seed moisture. The same amount of cover sand was applied to each sample dish. After the eight dishes were prepared, the fertilizers and/or nutrients were added to the top of the cover sand layer accordingly to their treatment plan.

After planting and treating the sample dishes, all samples were initially watered thoroughly with tap water using a spray bottle. The samples were watered with tap water every weekday and Sundays. Each sample was sprayed with water until the sand became just saturated. The amount of water sprayed onto each sample was recorded. The grow lights were kept on the same cycle (on at 6:00 AM and off at 8:00 PM) throughout the five-week study.

As the samples were watered, they were visually monitored for growth and pictures were taken daily after the seeds germinated. Growth patterns in each sample were recorded and photographed. The amounts of water sprayed onto the samples were also recorded and monitored for consumption changes.

To quantify the amount of growth each treatment produced, a procedure was developed to evaluate the final plant mass of the treatment samples. This procedure basically involved rinsing the sand from the grass and roots, removing the excess water (from rinsing) using a salad spinner, and then weighing the grass and roots. This procedure was developed to quantify differences in plant growth between the eight treatment samples.

Results indicate both the Control Sample #1 and Sample #2 (Scotts Fertilizer only) took one day longer to germinate than the other samples. Over half the samples had growth along the edges of the tray before the center portion started to grow. It is unknown why this occurred since great care was taken to evenly spread the seeds and apply a cover layer over them.

Figure 2:
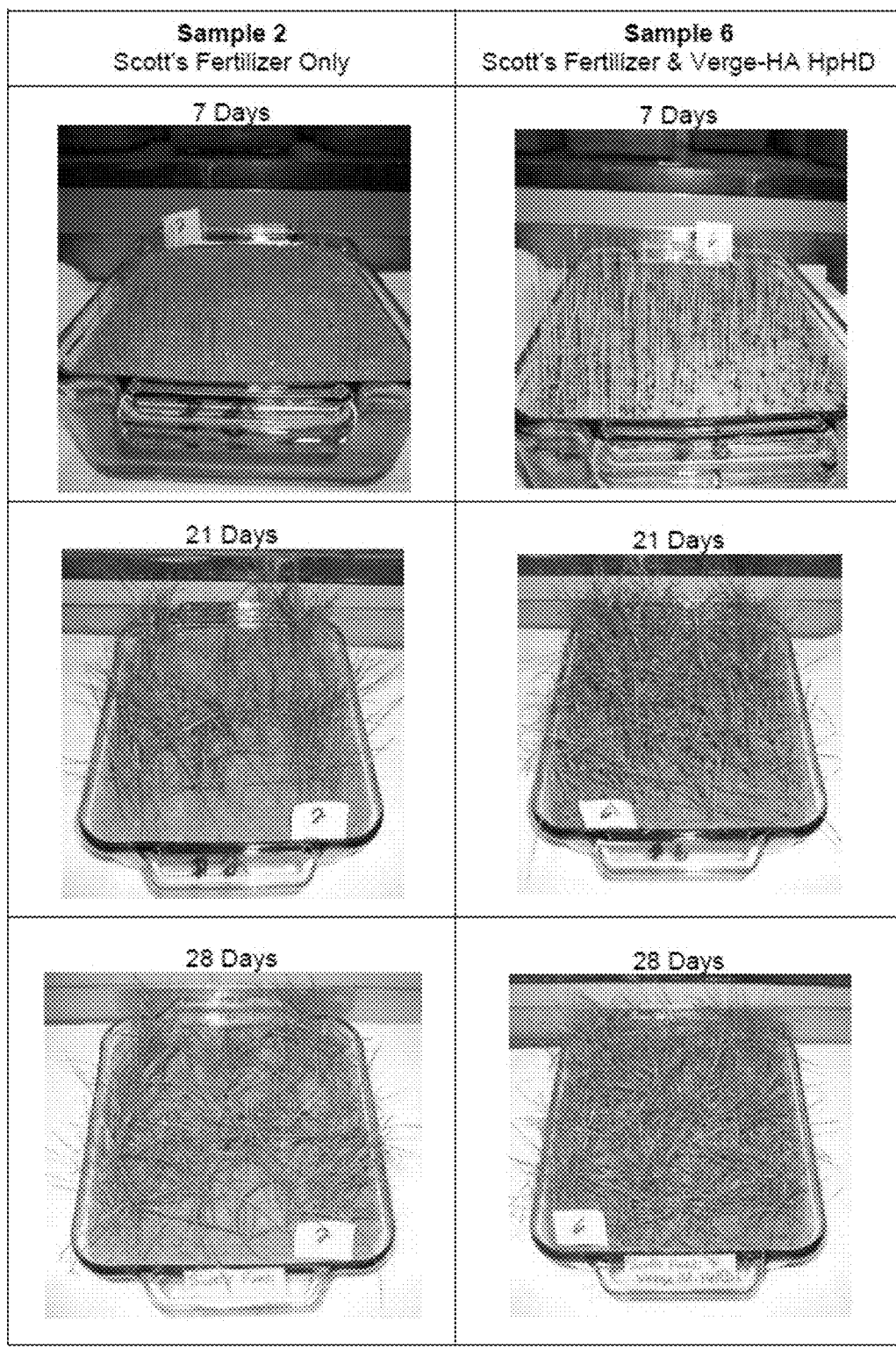
FIG. 2 depicts a growth comparison between Scott's Fertilizer with and without Verge-HA.

Results indicate the addition of Verge-HA HpHD to either Scott's or Miracle Gro® fertilizers increased the rate of growth and plant mass of the rye grass. This can be seen by the pictures in FIG. 2 where Sample #6 (containing both Scotts Fertilizer and Verge-HA HpHD) shows quicker and fuller growth over Sample #2 where Scotts Fertilizer was used alone. This was confirmed by the Plant Mass Evaluation test results (see Table 4) where Sample #6 plant mass was significantly greater (about 33%) than the plant mass of Sample #2.

TABLE 4

Plant mass determination and water applied.

| SAMPLE | SAMPLE DESCRIPTION | Final Plant Mass Weight (g) | Total Water Applied (g) |
| --- | --- | --- | --- |
| 1 | Control No Fertilizer | 16.6 | 1932 |
| 2 | Scotts Fert Only | 16.5 | 2035 |
| 3 | Miracle Grow Fert Only | 15.2 | 1843 |
| 4 | Leonardite Fines Only | 14.7 | 1951 |
| 5 | Scotts Fert & Leonardite Fines | 15.7 | 1900 |
| 6 | Scotts Fert & Verge HA HpHD | 22.0 | 1939 |
| 7 | Scotts Fert & Verge HA LpHD | 15.9 | 2033 |
| 8 | Miracle Fert & Verge HA HpHD | 17.9 | 2090 |

Figure 3:
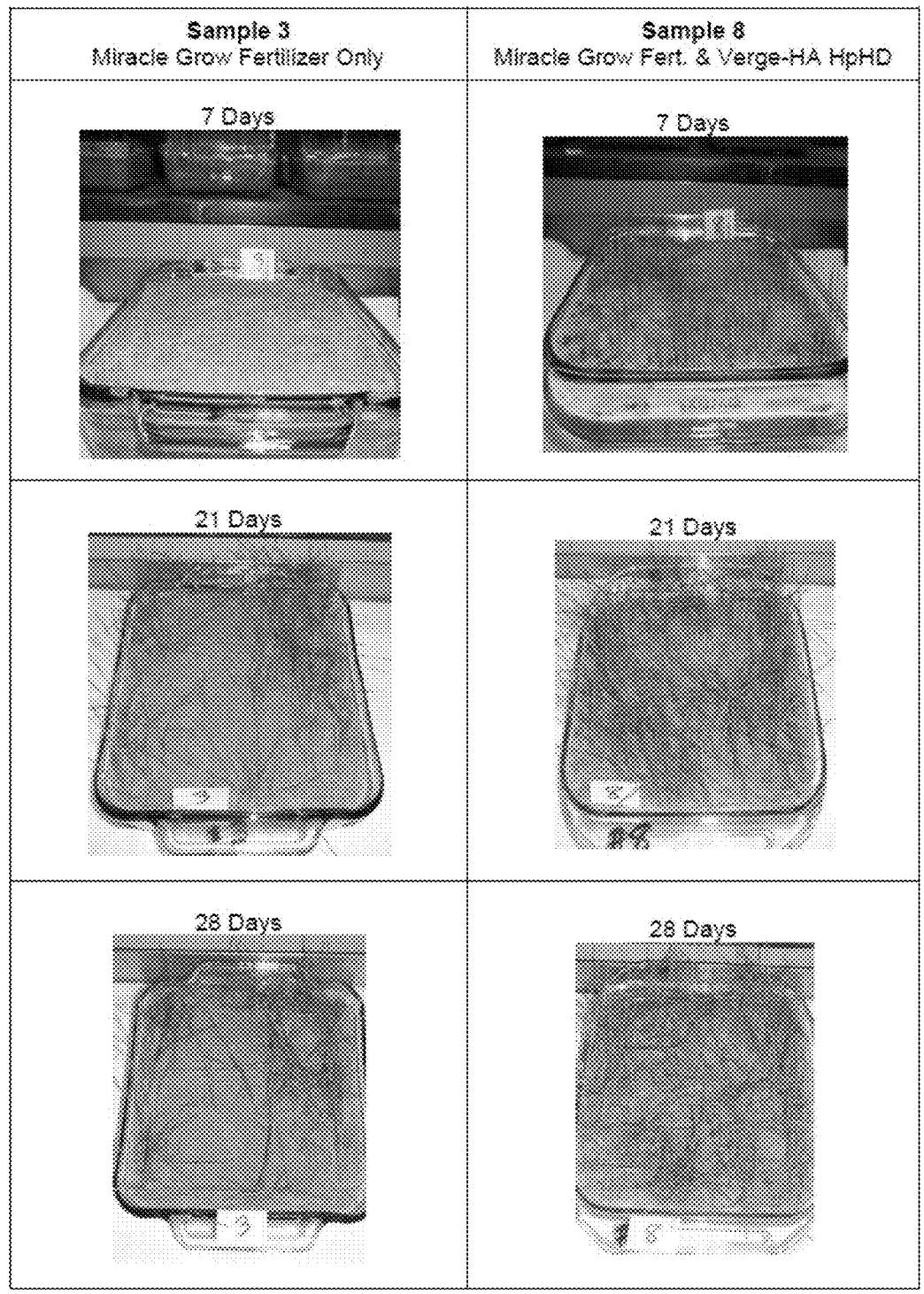
FIG. 3 depicts a growth comparison between Miracle Gro® fertilizer with and without Verge-HA.

The benefits of adding Verge-HA HpHD could also be seen with the Miracle Gro® Fertilizer. The pictures in FIG. 3 show how treatment Sample #8 (treated with Miracle Gro® Fertilizer and Verge-HA HpHD) grew quicker and fuller than Sample #3 where Miracle Gro® Fertilizer was used alone. The plant mass data in Table 4 confirm that the plant mass of Sample #8 was greater than Sample #3 by almost 18%. These growth patterns indicate that Verge-Ha HpHD benefits plant growth when added with fertilizer.

Figure 4:
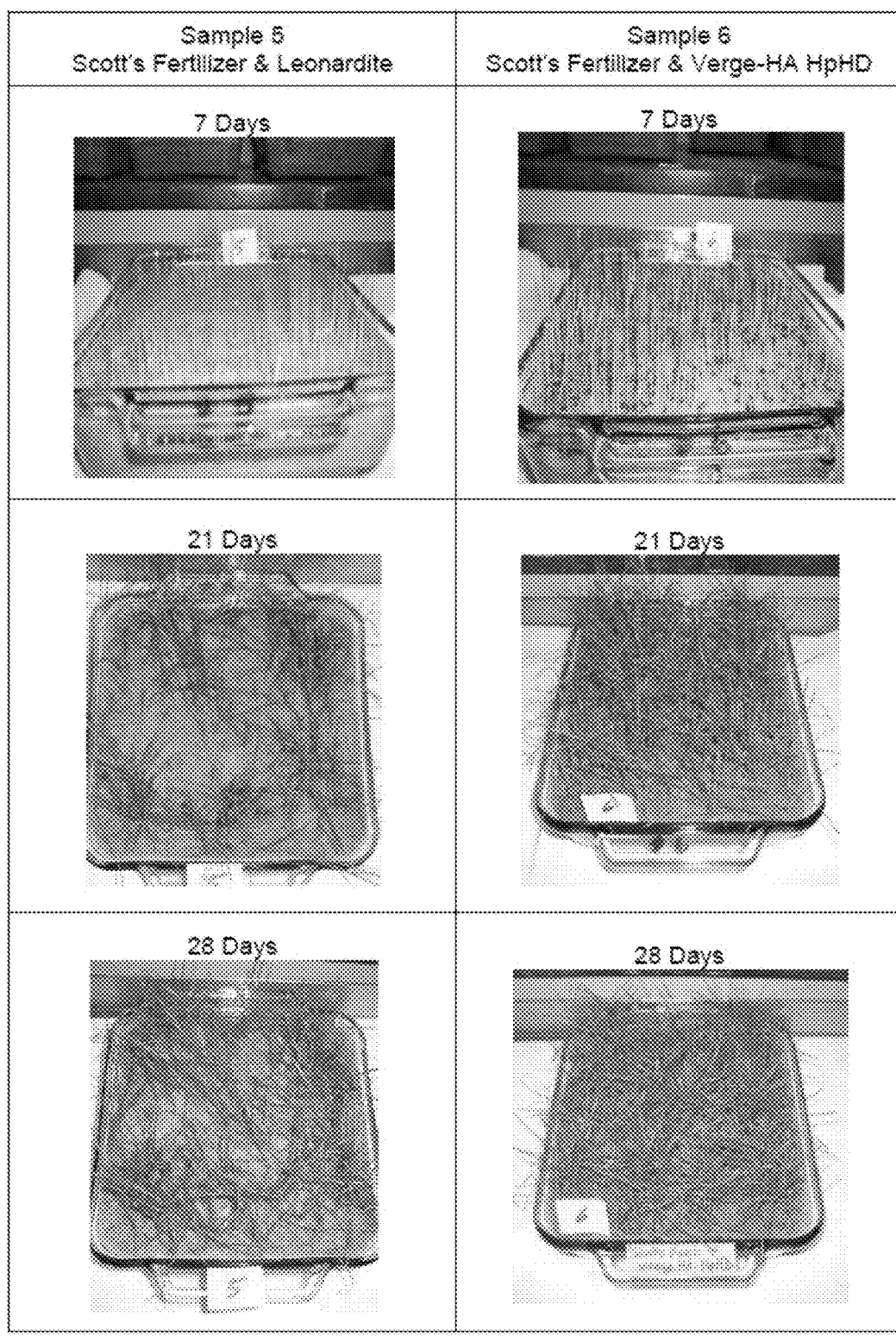
FIG. 4 depicts comparing growth rates of leonardite and Verge-HA high pH disintegrating ("HpHD").

It can be seen by the pictures in FIG. 4, that Sample #6 (fertilizer and Verge-HA HpHD) outperformed Sample #5 (fertilizer and leonardite) in both growth rate and plant mass. It should be noted that both Verge-HA and leonardite were dosed to have equal amounts of humic acid applied to their sample trays, yet appears the humic acid in the Verge-HA sample was more beneficial to the grass than the leonardite. This could be because the humic acid in the Verge-HA HpHD is more soluble in tap water than the humic acid in leonardite. FIG. 1 shows the quick solubility of the humic acid in Verge-HA HpHD with its initial watering as the dissolving humic acid (brown coloring) leaches from the granules and permeates into the sand.

Growth Patterns of Verge-HA HpHD (Fast-Release) and Verge-HA LpHD (Slow-Release)

Figure 5:
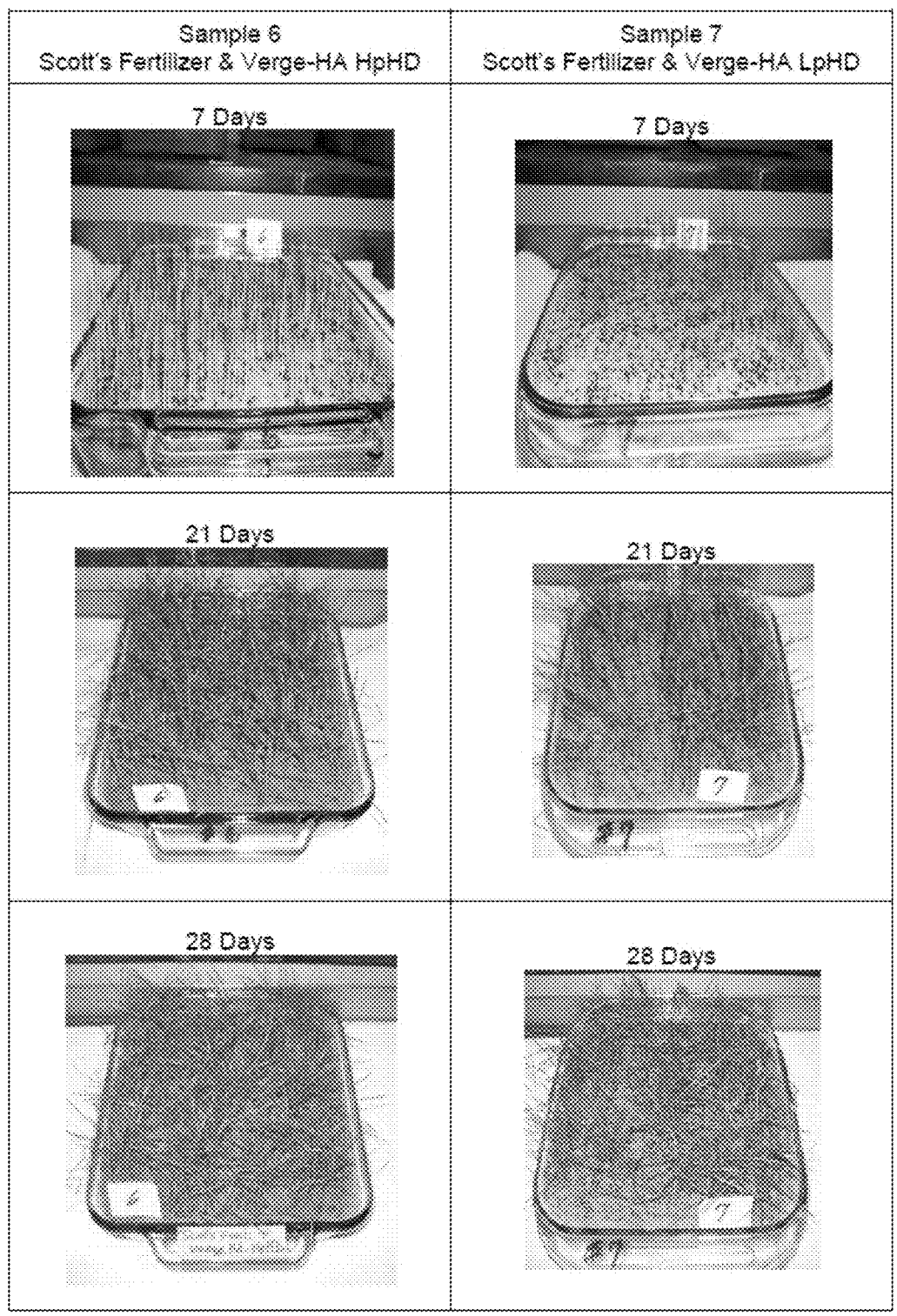
FIG. 5 depicts comparing growth rates between Verge-HA HpHD and Verge-HA low pH disintegrating ("LpHD").

The difference between the HpHD and LpHD versions of Verge-HA is the pH, resulting from the particular dispersant used in the formulation. FIG. 5 shows the growth patterns of Sample #6 (HpHD) and Sample #7 (LpHD) over 28 days. It can be seen by the pictures how the Sample #6 has fast and full growth throughout the growth period. Sample #7 is slower to grow the first two weeks as can be seen by the pictures. However, at 21 days, Sample #7 starts to "catch-up" to its fast-releasing counterpart (Sample #6) and by 28 days, the grass is starting to fill in. This indicates Verge-HA LpHD does release its humic acid, but at a slower pace than the HpHD version. The slower-growth of Sample #7 might explain the lower plant mass value (see FIG. 5) when compared to Sample #6. If the study were extended, the slow-releasing Sample #7 might have caught up to Sample #6. The LpHD prototype would be good for applications that prefer a long-term product to slowly release humic acid over a period of time. For applications that demand instant humic acid feeding, the HpHD version might be more appropriate.

Results from the growth study indicate that using Verge-HA HpHD benefits plant growth over using fertilizer alone and/or leonardite. It appears the quick solubility of the humic acid in Verge-HA HpHD might be the main characteristic that makes the prototype more effective than leonardite. The study also showed how the grass treated with the slow-releasing Verge-HA LpHD, started to "catch up" to the fast-releasing Verge. This is favorable for applications that prefer a long-term, slow-releasing product Growth Study Planting Procedure:

1. Obtain clean dry quartz play sand. (Do not use coarse or ultra fine sand.) Be sure there is enough sand from the same lot or composite to use in all sample trays.

2. Assemble clean and dry square 8"×8" casserole dishes. Be sure all sample dishes have the same dimensions and shape.

3. Tare one of the dishes, and fill it with enough sand up to ½ inch from the very top of the rim. Smooth out the sand layer and make sure it is level. Add more sand if necessary to be ½ inch from the top.

4. Weigh the dish to get the weight of sand added to the dish.

5. Fill all other sample dishes with the same amount of sand used in the first dish. Smooth out and level the sand layers of the other samples.

6. Sprinkle the recommended dosage of seeds evenly across the layer of sand. (This amount would be calculated for 64 square inches and based upon the recommended application rate from supplier.

7. Tare or pre-weigh one of the sample dishes (containing the sand and seeds).

8. Carefully apply a ¼ inch layer of sand on top of the seeds. Be sure not to move the seeds while applying the layer. Smooth the cover layer so that it is level. (The top of the cover layer should be ¼ inches from the top of the dish rim.)

9. Re-weigh the dish to obtain the amount of sand used in the cover layer.

10. Apply the same amount of sand used in the cover layer (Step 9) to the other sample dishes—making sure not to disturb the positioning of the seeds as you apply the sand. Smooth and level the surface of this over layer.

11. Apply whatever fertilizer(s) or nutrients to the top of the cover sand layer. Be sure to apply evenly for better distribution.

12. Give all samples an initial watering by first tare all samples dishes. Using a spray bottle, spray enough tap water onto the samples to just saturate the sand. Re-weigh the samples to record the amount of water applied.

13. Mount a 48 inch shop light fixture over the grow bench so that it is 25 inches above the bench. Connect a powder timer to the light fixture and install Philips T12, 48" and 40 watts lights in the fixture.

14. Place all samples under the grow lights. Be sure all sample dishes are centered under the lights.

15. Start the timer to go on at 6:00 AM and shut off at 8:00 PM.

11. When all sections have been washed of the sand and placed into the second salad spinner bowl, place the spinner top on the second bowl.

12. Pump the spinning action of the basket until all excess water has been removed from the plant mass.

13. Lift the basket out of the bowl and blot/wipe off any residual water droplets on the basket.

14. Re-weigh the basket containing the plant mass to obtain the final plant mass value.

15. Plant mass can then be either saved for photographing or disposed.

16. Clean and blot-dry both salad spinners and their baskets.

17. Repeat Steps 4 through 16 with the other samples.

TABLE 5

Amounts of sand, rye seeds, fertilizer, and nutrients used in Example #1

|  | SAMPLE 1 Control No Fertilizer | SAMPLE 2 Scotts Fert Only | SAMPLE 3 Miracle Grow Fert Only | SAMPLE 4 Leonardite Fines Only | SAMPLE 5 Scotts Fert & Leonardite Fines | SAMPLE 6 Scotts Fert & Verge HA— HpHD | SAMPLE 7 Scotts Fert & Verge HA— LpHD | SAMPLE 8 Miracle Fert & Verge HA— HpHD |
|---|---|---|---|---|---|---|---|---|
| Rye Seeds (R13-410) | 1.672 g | 1.672 g | 1.672 g | 1.672 g | 1.672 g | 1.672 g | 1.672 g | 1.672 g |
| Scotts Fertilizer (R13-411) | — | 0.300 g | — | — | 0.300 g | 0.300 g | 0.300 g | — |
| Miracle Grow Fertilizer (R13-412) | — | — | 67.296 g dilute soln. | — | — | — | — | 67.296 g dilute soln. |
| Leonardite Fines (R13-085) | — | — | — | 0.278 g | 0.278 g | — | — | — |
| Verge HA HpHD (S-13094-B) | — | — | — | — | — | 2.770 g | — | 2.770 g |
| Verge HA LpHD (S-13093-C) | — | — | — | — | — | — | 2.770 g | — |
| Sand (R13-407 & 408) (base layer) | 2483.1 g | 2483.2 g | 2483.3 g | 2483.0 g | 2483.5 g | 2486.1 g | 2483.2 g | 2483.3 g |
| Sand (R13-407 & 408) (cover layer) | 521.4 g | 520.7 g | 521.1 g | 521.1 g | 521.8 g | 521.1 g | 521.6 g | 521.2 g |

Plant Mass Determination Procedure:

1. Two-three hours before starting test, water test samples.

2. Acquire two large salad spinners of the same model and make. Make sure they are clean.

3. Line both inner baskets with standard aluminum screening material (the kind used to replace the screening in windows). Be sure to line basket with a single layer and avoid too much overlap of screening mesh.

4. Place one of the screen-lined baskets into the first salad spinner bowl and fill with tap water to ⅔ capacity.

5. Cut the sand/plant layers in one of the sample dishes into sections. Note any observations in plant roots.

6. Place one of the cut sections into the salad spinner bowl with water.

7. Gently lift the basket up and down in the water until all of the sand has been washed through the screen, leaving the grass and roots (plant mass) in the basket.

8. Tare the second screen-lined basket.

9. Carefully transfer the washed plant mass into the second salad spinner bowl (containing the other tared screen-lined basket).

10. Repeat Steps 6 through 8 with the remaining sections of the sample.

Example 2

Humic Acid Growth Study

The objective of the Example was to assess the effects of various humic acid-containing granules on the plant growth of rye grass.

This growth study tested various granules which contained humic acid. Two of the samples were two Verge-HA prototypes (HpHD, fast-releasing and LpHD, slow-releasing). These two prototypes were produced using the LCI basket extruder to simulate Verge plant properties. This study also tested Andersons Humic-DG product. Various treatments were applied to sample dishes containing inert silica sand with planted rye grass seeds. To aid in full germination, less sand was added in the cover layer over the seeds.

Because all samples showed ample growth, comparisons between the samples were based upon plant mass evaluation. The Verge-HA samples appear to increase plant mass in the rye grass over Andersons Humic-DG. Surprisingly, samples without fertilizer yielded more plant growth than the samples with fertilizer. All samples grew rapidly and were trimmed to a 2 inch height after 14 days.

For this Example, the samples of Verge-HA HpHD and LpHD were produced using a basket extruder from LCI. The extrudate was spheronized and the granules were dried using the conveyor oven set at 200° F. The samples were screened to be 120 SGN. About 10% Leonardite Source Fines was formulated into both prototypes to yield samples with about 5%-7% humic acid content. Two different dispersants were added to the formulations to obtain a fast-releasing (higher pH) prototype and the slow-releasing prototype (lower pH). The Verge-HA prototype formulations are listed in Table 5 below.

TABLE 5

Verge-HA formulations and processing.

| | Verge-HA HpHD | Verge-HA LpHD | Verge-HA SDG |
|---|---|---|---|
| Formulation | 87% Verge Feed 10% Leonardite Fines 3% Sodium Carbonate | 88% Verge Feed 10% Leonardite Fines 2% STPP | 90% Verge Feed 10% Leonardite Fines |
| Processing | Dry ingredients pre-blended together. Powder blend extruded with water through 1.2 mm die plate using LCI basket extruder Extrudate spheronized and dried. | Dry ingredients pre-blended together. Powder blend extruded with water through 1.2 mm die plate using LCI basket extruder Extrudate spheronized and dried. | Dry ingredients pre-blended together. Powder blend extruded with water through 1.2 mm die plate using Bonnot extruder Extrudate spheronized and dried. |
| Screening | 1.4 mm or (−12, +16 mesh) | 1.4 mm or (−12, +16 mesh) | 1.4 mm or (−12, +16 mesh) |

This Example involved testing the growth of grass seeds in sand using fertilizers, the two Verge-HA prototypes, and Andersons Humic-DG product. Also included was a Verge-SDG sample made with the same base clay as the two prototypes, but with no chemical pH adjuster or dispersant. The samples were tested with and without fertilizer and there were two control samples (with and without fertilizer. The main goal of the study was to evaluate differences between the additives (and combinations of the additives) and their effects on plant growth.

Grass Seeds: Rye grass was again chosen for this study because it grows fast. The Pennington perennial rye grass seeds proved to be consistent with germination and also contain over 95% rye grass varieties. It should be noted that these seeds had been treated with water-efficiency chemicals to aid in their germination.

Growth Medium: Inert quartz sand was the growth medium versus soil. Because the main goal of the study was to evaluate differences between the additives (and combinations of the additives), inert quartz sand was chosen because it would not contribute any nutrients to the plant growth (which might skew the results).

Treatment Samples: Table 6 shows the various fertilizer/nutrient treatments and combinations. There were eight treatment samples total, including a Control sample where no treatment was applied. One of the fertilizers, Scott's Lawn Turf Starter, was tested with and without leonardite and the two Verge prototypes. Miracle Gro® Lawn was the other fertilizer tested in the study.

TABLE 6

Description of treatments.

| #1 CONTROL (No Treatment) | #3 Verge-HA HpHD & Fertilizer | #5 Verge-HA LpHD & Fertilizer | #7 Fertilizer only |
| #2 Verge-HA HpHD Only | #4 Andersons Humic-DG only | #6 Verge-HA SDG & Fertilizer | #8 Andersons Humic-DG & Fertilizer |

The goal behind this test plan was to see if the Verge-HA prototypes improved grass growth with and without fertilizer. The Example also aimed to see if the humic acid in the two Verge-HA prototypes worked better than using the competitor Andersons Humic-DG product. The leonardite used in this study was the same leonardite used in formulating the two Verge-HA prototypes.

Treatment Application Doses: The fertilizer was applied to the sample dishes at half the recommended dosage rates to make the test harder and increase stress upon the growing plants. Table 6 lists the applications dosage of the fertilizer. At half the recommended dosage, this stressed situation might better reveal growth trends when humates are introduced. The lowest recommended dosage of Andersons Humic-DG was 40 lbs/acre or 0.9 lb/1000 sq ft. With the advertised content at 60% humic acid, the amount of humic acid in this product would be about 0.5 lb/1000 sq ft. The amount of Verge-HA used in the sample treatments was calculated and measured so that the amount of active humic acid in the applied granules (Samples #2, #3, #5, and #6) would equal the amount of humic acid contained within the dosage of Anderson Humic-DG applied (Samples #4 and #8).

TABLE 6

Application rates of fertilizers and nutrients used in study.

| Fertilizer/Nutrient | Application Rate used in Study | Active Nutrients |
|---|---|---|
| Scott's Turf Builder Starter | 1.5 lb/1000 sq ft | Nitrogen: 0.36 lbs/1000 sq ft $P_2O_5$: 0.375 lbs/1000 sq ft $K_2O$: 0.06 lbs/1000 sq ft |
| Andersons Humic-DG | 40 lbs/acre or 0.9 lb/1000 sq ft | Humic Acid: 0.5 lb/1000 sq ft |
| Verge-HA HpHD Verge-HA LpHD Verge-HA SDG | 11 lb/1000 sq ft | Humic Acid: 0.5 lb/1000 sq ft |

Growth Dishes: The study used 8"L×8"W×2H" square glass casserole dishes as the growth trays. The eight dishes had the same shape and dimensions.

Hardware Set Up: The growth study was conducted in the lab on a lab bench. A 48" shop light fixture was suspended 25" from above the lab bench and two grow lights were installed in this light fixture. The grow lights were Philips T12, 48" and 40 watts. The grow light fixture was attached to a timer that was set to turn on at 6 AM and turn off at 8 PM (14 hours of illumination). The temperature in the lab was kept at a constant range of 70° F.-72° F.

One of the main concerns was to use consistency when preparing the growth sample dishes. The eight samples were prepared by the same technician. Each of the sample dishes was filled with the same amount of sand and the rye seeds were evenly applied to the top of the base sand layer. The amount of seeds used was based upon Pennington's web site recommendations and the same amount was used for each sample dish. The seeds were then covered with a layer of sand to help prevent seed drift and maintain seed moisture. The same amount of cover sand was applied to each sample dish. It should be noted that the amount of sand used in the cover layer was half the amount used in previous studies. After the eight dishes were prepared, the fertilizers and/or nutrients were added to the top of the cover sand layer accordingly to their treatment plan.

After planting and treating the sample dishes, all samples were initially watered thoroughly with tap water using a spray bottle. The samples were watered with tap water every weekday and Sundays. Each sample was sprayed with water until the sand became just saturated. The amount of water sprayed onto each sample was recorded. The grow lights were kept on the same cycle (on at 6:00 AM and off at 8:00 PM) throughout the five-week study.

As the samples were watered, they were visually monitored for growth patterns in each sample. Pictures were taken of the samples weekly and the amounts of water sprayed onto the samples were also recorded and monitored for consumption changes.

The grass samples grew so rapidly (one sample reached five inches) that they had to be trimmed after 14 days. Each sample was trimmed by hand down to a two inch height. A ruler was used to measure the height and the grass was carefully trimmed using scissors. The grass clipping from each sample was weighed and recorded.

To quantify the amount of growth each treatment produced, a procedure was developed to evaluate the final plant mass of the treatment samples. This procedure basically involved rinsing the sand from the grass and roots, removing the excess water (from rinsing) using a salad spinner, and then weighing the grass and roots. This procedure was developed to quantify differences in plant growth between the eight treatment samples.

For the Final Plant Mass values, the weights of the grass clipping were added to the weights of the grass and roots.

All samples germinated on the same day. It appears the reduction in the cover sand layer might have enabled more seeds to germinate and grow evenly across the area of each sample dish.

Figure 6:
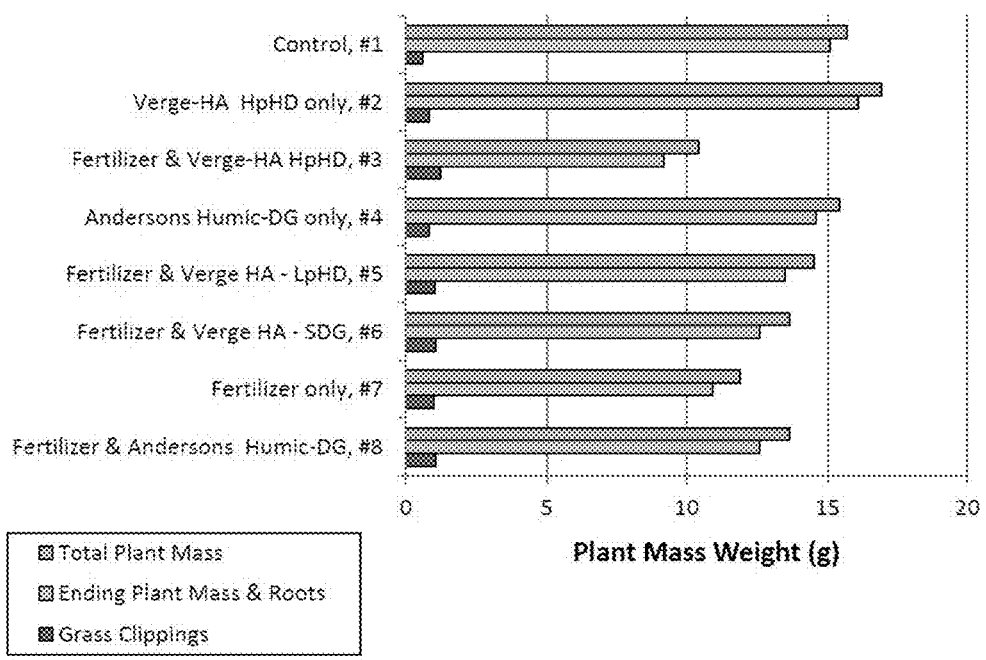
FIG. 6 depicts a complete table of plant mass determination.

FIG. 6 is a chart of the plant mass for each sample. It can be seen that the Total Plant Mass values of the samples treated with fertilizer were lower than the Total Plant Mass values of the samples without fertilizer. This is unexpected since it is assumed that fertilizer aids plant growth. This trend is evident when comparing all samples growths with fertilizer to the sample growths without fertilizer. The Control Sample #1 that was not treated with anything had significantly higher plant mass than Sample #7 that was treated with fertilizer. Sample #2 (Verge-HA HpHD only) had higher plant mass than Sample #3 (Verge-HA HpHD & Fertilizer). This relationship occurred even with the Andersons Humic-DG product which yielded higher plant mass when used without fertilizer.

Results in FIG. 6 indicate that when added by itself, Verge-HA HpHD promoted the highest plant growth over the other samples tested including Andersons Humic-DG. This can be seen by the highest plant mass value of the Verge-HA HpHD Sample # 2 over the other sample treatments (including Andersons product Sample #4). Although the Verge-HA prototypes have much lower humic acid content (~5%) than what Andersons Humic-DG contains (~60%), the humic acid in Verge-HA appears to be more soluble and available to the growing plants.

Figure 7:
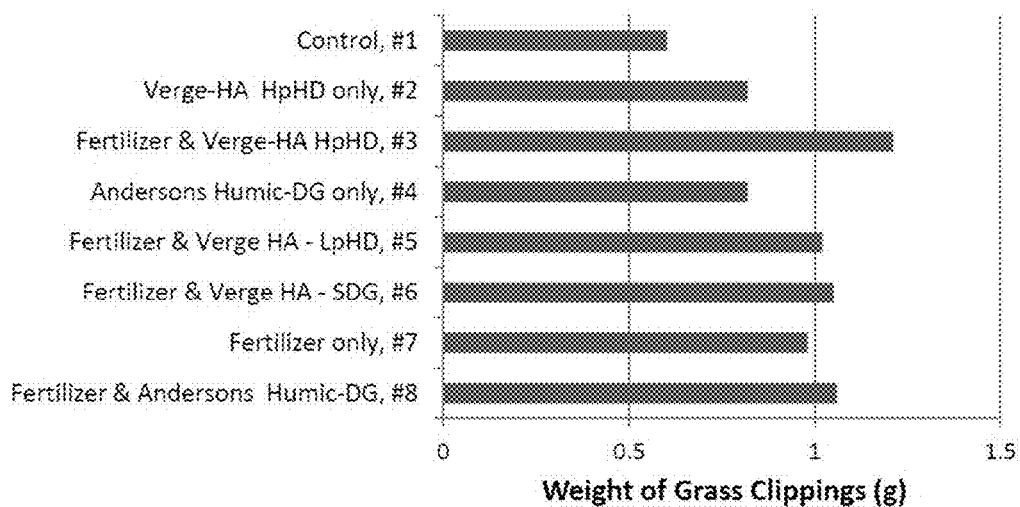
FIG. 7 depicts grass clippings from all samples.

There appears to be a growth anomaly in Sample #3 where a combination of Verge-HA HpHD and a fertilizer was applied. One would assume that while Verge-HA HpHD alone promoted very high growth, it would promote even higher growth when combined with fertilizer. However, in this study, Sample #3 yielded the lowest Total Plant Mass value of all samples as can be seen in FIG. 4. Also, the results from a previous study (Growth Study #1) indicated that a combination of Verge-HA HpHD and fertilizer produced the most growth. One explanation for this anomaly might be how Sample #3 was trimmed When looking at the Grass Clippings bars (blue) in FIG. 7, it can be seen that Sample #3 had the highest amount of grass trimmed from it after 14 days. This suggests that the combination of Verge-HA HpHD and fertilizer resulted in more rapid growth than the other treatments within those first 14 days. However, it can be seen by the data in FIG. 4, that at the end of the study, Sample #3 had the lowest plant mass of all of the samples. This unexpected outcome might be attributed to too much grass being trimmed off. At 14 days. Sample #3 experienced the most growth, reaching a height of over 5.5 inches. The other samples were at about 4 to 4.5 inches. It could be that trimming off over half its height (3 inches) was too much of a shock for its underdeveloped root base. It was noted that after trimming, Sample #3 began to falter and many grass blades started to wither and die. The other samples had less grass clipped from them and they were able to survive better.

Figure 8:
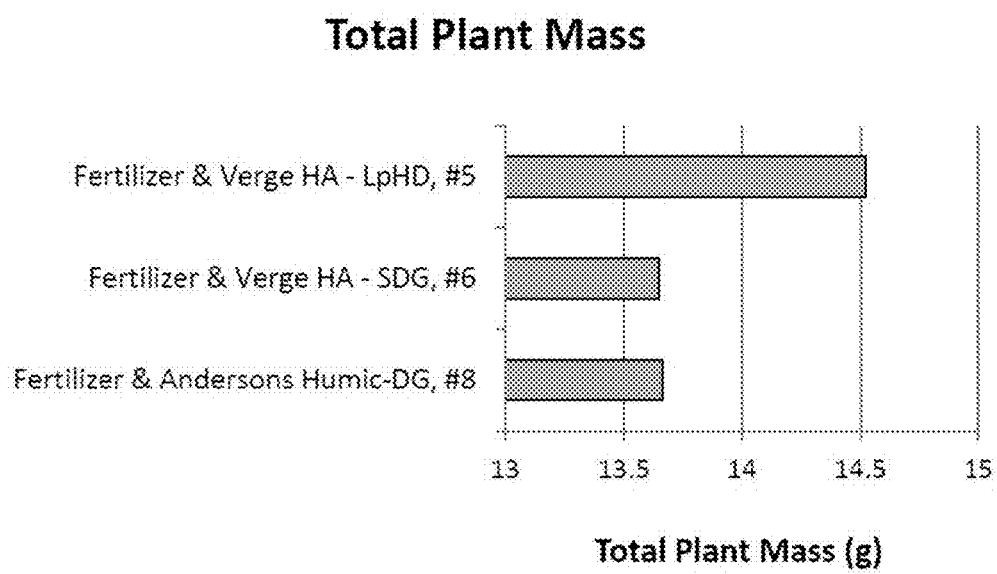
FIG. 8 depicts total plant mass.

It can be seen by the data in FIG. 8 that Verge-HA LpHD promoted more plant growth than Verge-HA SDG. These two prototypes differ in that LpHD contains STPP and the SDG does not contain any chemical dispersants. It appears that LpHD is able to release more of its humic acid than SDG even though they contain the same amount of humic acid. It can also be seen by FIG. 8 that Verge-HA LpHD yielded more plant growth than Andersons Humic-DG. This suggests that although Andersons product contains more humic acid (~60%), the Verge-HA LpHD benefits plant growth better. The STPP in LpHD results in a more neutral pH which favors humic acid release better than the low pH of SDG. However, when comparing the SDG to the Andersons Humic-DG product, it can be seen that both samples performed equally with respect to plant mass even though Andersons contains more humic acid.

Results from the growth study indicate that using Verge-HA HpHD by itself promotes plant growth more than the other sample treatments. While only containing about 5% humic acid, all three Verge-HA prototypes yielded higher plant mass values than the Andersons Humic-DG product which contains 60% humic acid. While there were unexplained anomalies involving the fertilizer, there were still growth trends. Another anomaly occurred with the sample using a combination of Verge-HA HpHD and fertilizer. It appears that while this sample started out with rapid growth, it faltered after being trimmed too aggressively.

Figure 9:
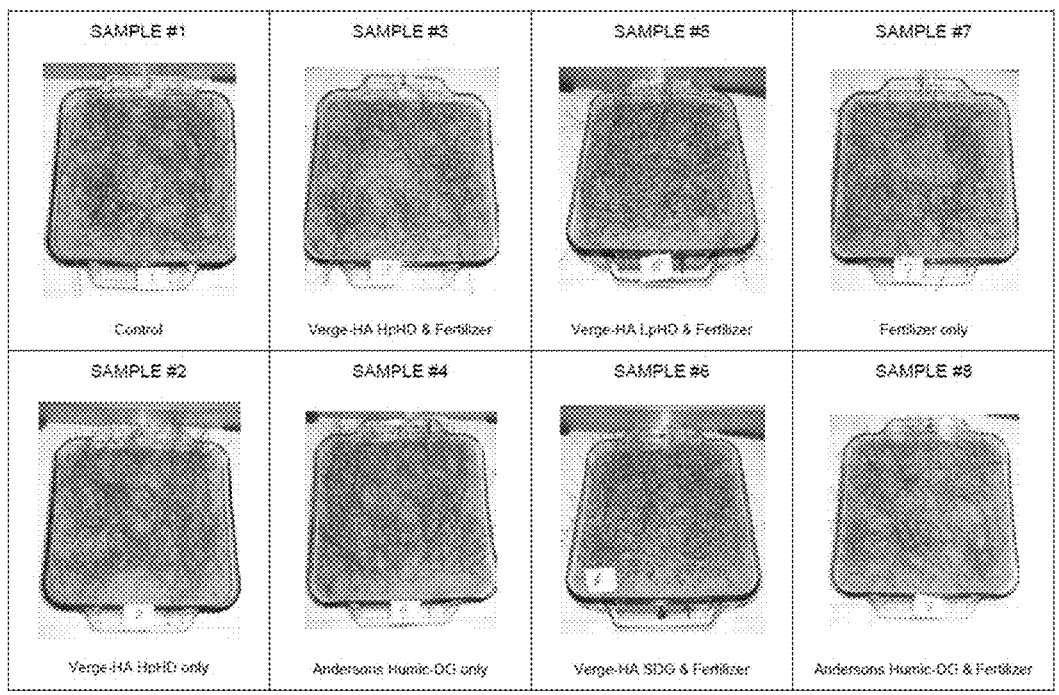
FIG. 9 depicts pictures of samples on Day 28.

FIG. 9 depicts pictures of samples on Day 28.

Growth Study Planting Procedure"

1. Obtain clean dry quartz play sand.

2. Assemble clean and dry square 8"×8" casserole dishes. Be sure all sample dishes have the same dimensions and shape.

3. Weigh out 2483g of sand into each sample dish. Smooth out and level the sand layers in each dish.

4. Sprinkle the recommended dosage of seeds evenly across the layer of sand. (This amount would be calculated for 64 square inches and based upon the recommended application rate from supplier.

5. Spray water onto seeds to soak them without disturbing their even distribution.

6. Weight out 250 g of sand and carefully and evenly sprinkle this sand on top of the wetted seeds. Be sure not to move the seeds while applying the layer. Do NOT smooth or pat down this cover layer—keep as un-compacted as possible.

7. Apply whatever fertilizer(s) or nutrients to the top of the cover sand layer. Be sure to apply evenly for better distribution.

8. Give all samples an initial watering by first taring all samples dishes. Using a spray bottle, spray enough tap water onto the samples to just saturate the sand. Re-weigh the samples to record the amount of water applied.

9. Mount a 48 inch shop light fixture over the grow bench so that it is 25 inches above the bench. Connect a powder timer to the light fixture and install Philips T12, 48" and 40 watts lights in the fixture.

10. Place all samples under the grow lights. Be sure all sample dishes are centered under the lights.

11. Start the timer to go on at 6:00 AM and shut off at 8:00 PM.

9. Carefully transfer the washed plant mass into the second salad spinner bowl (containing the other tared screen-lined basket).

10. Repeat Steps 6 through 8 with the remaining sections of the sample.

11. When all sections have been washed of the sand and placed into the second salad spinner bowl, place the spinner top on the second bowl.

12. Pump the spinning action of the basket until all excess water has been removed from the plant mass.

13. Lift the basket out of the bowl and blot/wipe off any residual water droplets on the basket.

14. Re-weigh the basket containing the plant mass to obtain the final plant mass value.

15. Plant mass can then be either saved for photographing or disposed.

16. Clean and blot-dry both salad spinners and their baskets.

17. Repeat Steps 4 through 16 with the other samples.

The invention is further described by the following numbered paragraphs:

TABLE 7

Amounts of sand, rye seeds, fertilizer, and nutrients used in the Study #4.

| | SAMPLE 1 Control | SAMPLE 2 Verge HA— HpHD | SAMPLE 3 Scotts Fert & Verge HA— HpHD | SAMPLE 4 Andersons Humic-DG | SAMPLE 5 Scotts Fert & Verge HA— LpHD | SAMPLE 6 Scotts Fert & Verge HA— SDG | SAMPLE 7 Scotts Fert Only | SAMPLE 8 Scott Fert & Andersons Humic-DG |
|---|---|---|---|---|---|---|---|---|
| Rye Seeds (g) (R13-410) | 1.672 | 1.672 | 1.672 | 1.672 | 1.672 | 1.672 | 1.672 | 1.672 |
| Scotts Fertilizer (g) (R13-411) | — | — | 0.300 | — | 0.300 | 0.300 | 0.300 | 0.300 |
| Verge HA HpHD (g) (S-13176) | — | 2.223 | 2.223 | — | — | — | — | — |
| Verge HA LpHD (g) (S-13177) | — | — | — | — | 2.223 | — | — | — |
| Verge HA SDG (g) (S-13093-8) | — | — | — | — | — | 2.223 | — | — |
| Andersons Humic-DG (g) (R13-675) | — | — | — | 0.185 | — | — | — | 0.185 |
| Sand (g) (R13-788) (base layer) | 2483.2 | 2483.3 | 2483.1 | 2483.1 | 2483.2 | 2483.3 | 2483.1 | 2483.2 |
| Sand (g) (R13-788) (cover layer) | 250.1 | 250.1 | 250.2 | 250.2 | 250.1 | 250.1 | 250.1 | 250.1 |

Plant Mass Determination Procedure

1. Two-three hours before starting test, water test samples.

2. Acquire two large salad spinners of the same model and make. Make sure they are clean.

3. Line both inner baskets with standard aluminum screening material (the kind used to replace the screening in windows). Be sure to line basket with a single layer and avoid too much overlap of screening mesh.

4. Place one of the screen-lined baskets into the first salad spinner bowl and fill with tap water to ⅔ capacity.

5. Cut the sand/plant layers in one of the sample dishes into sections. Note any observations in plant roots.

6. Place one of the cut sections into the salad spinner bowl with water.

7. Gently lift the basket up and down in the water until all of the sand has been washed through the screen, leaving the grass and roots (plant mass) in the basket.

8. Tare the second screen-lined basket.

1. A composition comprising:
    (i) a mineral or organic carrier capable of binding the other ingredients of (ii) and (iii);
    (ii) a source for humates and/or fulvic acid; and
    (iii) either (a) a pH adjuster or modifier to increase the pH of the resulting product; and/or (b) a dispersant with a pH adjustment effect.

1. The composition of paragraph 1, wherein the mineral or organic carrier is extruded and spheronized.

2. The composition of paragraph 1, wherein the mineral or organic carrier is agglomerated into granules and dried.

3. The composition of any one of paragraphs 1-3, wherein the mineral or organic carrier is calcium bentonite, calcium montmorillonite, sodium montmorillonite, attapulgite, palygorskite, sodium bentonite, kaolin, fuller's earth, sepiolite, recycled paper, fly ash, spent bleaching clay, wheat hulls, rice hulls, powdered walnut shells, bran powders, quartz, and/or combination/blends of these materials.

4. The composition of any one of paragraphs 1-4, wherein the mineral or organic carrier is a clay which is a calcium montmorillonite or sodium montmorillonite.

5. The composition of any one of paragraphs 1-5, wherein the mineral or organic carrier is Porter's Creek Formation.

6. The composition of paragraph 6, wherein the mineral or organic carrier is about 60% to about 90% of the composition by weight.

7. The composition of any one of paragraphs 1-7, wherein the source for humates is leonardite.

8. The composition of paragraph 8, wherein the leonardite is in the form of leonardite fines.

9. The composition of paragraph 9, wherein the leonardite fines is about 10-50% of the composition by weight.

10. The composition of any one of paragraphs 8-10 wherein the leonardite comprises about 50%-80% humic acid.

11. The composition of any one of paragraphs 1-11, wherein the source for humates is the same as the mineral or organic carrier.

12. The composition of any one of paragraphs 1-12 wherein the source for humates is peat.

13. The composition of any one of paragraphs 1-13 wherein the pH adjuster or modifier is soda ash or sodium carbonate.

14. The composition of any one of paragraphs 1-14 wherein the dispersant allows for faster release of the humates.

15. The composition of paragraph 15 wherein the dispersant is sodium carbonate. 16. The composition of any one of paragraphs 14 or 16 wherein the sodium carbonate is 1%-10% of the composition by weight.

17. The composition of any one of paragraphs 1-14 wherein the dispersant allows for slower release of the humates.

18. The composition of paragraph 18 wherein the dispersant is sodium tripolyphosphate (STPP) or sodium acid pyrophosphate (SAPP).

19. The composition of paragraph 19 wherein the STPP or SAPP is about 1%-10% of the composition by weight.

20. The composition of any one of paragraphs 1-20 wherein the pH adjuster or modifier is the same as the dispersant with a pH adjustment effect.

21. The composition of any one of paragraphs 1-21 wherein the pH ranges from about 5.5 to about 6.5.

22. The composition of paragraph 22 wherein in the pH ranges from about 8 to about 10.

23. A biostimulant comprising the composition of any one of paragraphs 1-23.

24. Use of the biostimulant of paragraph 24 for making the nutrients more bioavailable for plant growth.

25. Use of the biostimulant of paragraph 24 for the method of making the nutrients more bioavailable for plant growth through extrusion, agglomeration, or compaction/pressing.

\* \* \*

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A fast releasing humic acid dry granule composition comprising;

(i) about 60% to about 90% of the composition by weight of mineral or organic carrier which had been agglomerated into granules and dried and is selected from the group consisting of calcium bentonite, calcium montmorillonite, sodium montmorillonite, attapulgite, palygorskite, sodium bentonite, kaolin, fuller's earth, sepiolite, recycled paper, fly ash, spent bleaching clay, wheat hulls, rice hulls, powdered walnut shells, bran powders, quartz, and combination/blends of the foregoing;

(ii) a source for humates and/or fulvic acid; and (iii) about 1% about 10% of the composition by weight of a pH adjuster or modifier which is sodium carbonate or soda ash;

wherein:

the source for humates and/or fulvic acid and the pH adjuster or modifier is bound to the mineral or organic carrier;

the mineral or organic carrier has a size less than 2 mm; and the pH of the granule is from about 8 to about 10.

2. The dry granule composition of claim 1, wherein the mineral or organic carrier is extruded and spheronized.

3. The dry granule composition of claim 1, wherein the mineral or organic carrier is a clay which is a calcium montmorillonite or sodium montmorillonite.

4. The dry granule composition of claim 1, wherein the mineral or organic carrier is Porter's Creek Formation.

5. The dry granule composition of claim 1, wherein the source for humates is leonardite.

6. The dry granule composition of claim 5, wherein the leonardite is in the form of leonardite fines.

7. The dry granule composition of claim 6, wherein the leonardite fines is about 10-50% of the composition by weight.

8. The dry granule composition of claim 5 wherein the leonardite comprises about 50%-80% humic acid.

9. The dry granule composition of claim 1, wherein the source for humates is the same as the mineral or organic carrier.

10. The dry granule composition of claim 1 wherein the source for humates is peat.

11. A biostimulant comprising the dry granule composition of claim 1.

12. The dry granule composition of claim 1, wherein the mineral or organic carrier is heat treated calcium bentonite, calcium montmorillonite, sodium montmorillonite, attapulgite, palygorskite, sodium bentonite, kaolin, sepiolite or combination/blends of the foregoing.

13. A slow releasing humic acid dry granule composition comprising;

(i) about 60% to about 90% of the composition by weight of mineral or organic carrier which has been agglomerated into granules and dried and is selected from the group consisting of calcium bentonite, calcium montmorillonite, sodium montmorillonite, attapulgite, palygorskite, sodium bentonite, kaolin, fuller's earth, sepiolite, recycled paper, fly ash, spent bleaching clay, wheat hulls, rice hulls, powdered walnut shells, bran powders, quartz, and combination/blends of the foregoing;

(ii) a source for humates and/or fulvic acid; and (iii) about 1% to about 10% of the composition by weight of a dispersant with a pH adjustment effect which is sodium tripolyphosphate (STPP) or sodium acid pyrophosphate (SAPP);

wherein:

the source for humates and/or fulvic acid and the dispersant with a pH adjustment effect is bound to the mineral or organic carrier;

the mineral or organic carrier has a size less than 2 mm; and the pH of the granule is from about 5.5 to about 6.5.

14. The dry granule composition of claim 13, wherein the mineral or organic carrier is a clay which is a calcium montmorillonite or sodium montmorillonite.

15. The dry granule composition of claim 13, wherein the mineral or organic carrier is Porter's Creek Formation.

16. The dry granule composition of claim 13, wherein the source for humates is leonardite.

17. The dry granule composition of claim 16, wherein the leonardite is in the form of leonardite fines.

18. The dry granule composition of claim 17, wherein the leonardite fines is about 10-50% of the composition by weight.

19. The dry granule composition of claim 16. wherein the leonardite comprises about 50%-80% humic acid.

20. The dry granule composition of claim 13, wherein the source for humates is the same as the mineral or organic carrier.

21. The dry granule composition of claim 13, wherein the source for humates is peat.

22. The dry granule composition of claim 13, wherein the mineral or organic carrier is heat treated calcium bentonite, calcium montmorillonite, sodium montmorillonite, attapulgite, palygorskite, sodium bentonite, kaolin, sepiolite or combination/blends of the foregoing.

23. A biostimulant comprising the dry granule composition of claim 13.

* * * * *